United States Patent
Nevison

(10) Patent No.: US 10,907,088 B2
(45) Date of Patent: Feb. 2, 2021

(54) USE OF NATURAL GAS AS A VAPORIZING GAS IN A WELL INTERVENTION OPERATION

(71) Applicant: Halliburton Energy Services, Inc., Houston, TX (US)

(72) Inventor: Grant W Nevison, Alberta (CA)

(73) Assignee: Halliburton Energy Services, Inc., Houston, TX (US)

( * ) Notice: Subject to any disclaimer, the term of this patent is extended or adjusted under 35 U.S.C. 154(b) by 41 days.

(21) Appl. No.: 15/761,330

(22) PCT Filed: Sep. 8, 2016

(86) PCT No.: PCT/US2016/050678
§ 371 (c)(1),
(2) Date: Mar. 19, 2018

(87) PCT Pub. No.: WO2017/058485
PCT Pub. Date: Apr. 6, 2017

(65) Prior Publication Data
US 2018/0265769 A1    Sep. 20, 2018

Related U.S. Application Data

(60) Provisional application No. 62/235,241, filed on Sep. 30, 2015.

(51) Int. Cl.
*C09K 8/594* (2006.01)
*C09K 8/38* (2006.01)
(Continued)

(52) U.S. Cl.
CPC ............... *C09K 8/594* (2013.01); *C09K 8/38* (2013.01); *C09K 8/536* (2013.01); *E21B 37/00* (2013.01); *E21B 43/166* (2013.01)

(58) Field of Classification Search
CPC .......... C09K 8/594; C09K 8/38; E21B 43/166
See application file for complete search history.

(56) References Cited

U.S. PATENT DOCUMENTS

| 4,706,751 A | 11/1987 | Gondouin |
| 5,025,863 A | 6/1991 | Haines et al. |
| (Continued) | | |

FOREIGN PATENT DOCUMENTS

WO    2012097424 A1    7/2012

OTHER PUBLICATIONS

PCT International Search Report and Written Opinion dated Dec. 13, 2016, issued in corresponding application No. PCT/US2016/050678 filed on Sep. 13, 2016, 16 pgs.

*Primary Examiner* — Crystal J Miller
(74) *Attorney, Agent, or Firm* — Chamberlain Hrdlicka

(57) ABSTRACT

Methods for servicing a hydrocarbon well using natural gas in a well intervention operation can include preparing a working fluid having a composition containing about 10 wt % to 100 wt % of a gas phase natural gas, where the quantity and composition of the natural gas is selected so that under specified well intervention conditions, the natural gas and a liquid phase recovery target material form a mixture in the condensing vapor-gas or vapor-gas part of the mixture's phase envelope. During the well intervention operation and at the specified well intervention conditions, the method can include injecting the working fluid into the well, contacting the working fluid with the liquid phase recovery target material, vaporizing the recovery target material, and forming a homogeneous gas phase well mixture of the recovery target material and natural gas. At least a portion of the homogenous gas phase well mixture can be recovered at surface.

16 Claims, 8 Drawing Sheets

(51) Int. Cl.
    *E21B 43/16*     (2006.01)
    *C09K 8/536*     (2006.01)
    *E21B 37/00*     (2006.01)

(56) References Cited

U.S. PATENT DOCUMENTS

| | | |
|---|---|---|
| 9,033,035 B2 | 5/2015 | Nevison |
| 2004/0149438 A1 | 8/2004 | Shaw et al. |
| 2006/0065400 A1 | 3/2006 | Smith |
| 2012/0129738 A1 | 5/2012 | Gupta et al. |
| 2013/0025870 A1 | 1/2013 | Berry et al. |
| 2013/0341010 A1* | 12/2013 | Nevison .................. E21B 43/26 166/250.01 |
| 2014/0008074 A1* | 1/2014 | Nevison .................. E21B 43/26 166/308.6 |
| 2014/0034322 A1 | 2/2014 | Gupta et al. |
| 2014/0262285 A1 | 9/2014 | Sethna et al. |

\* cited by examiner

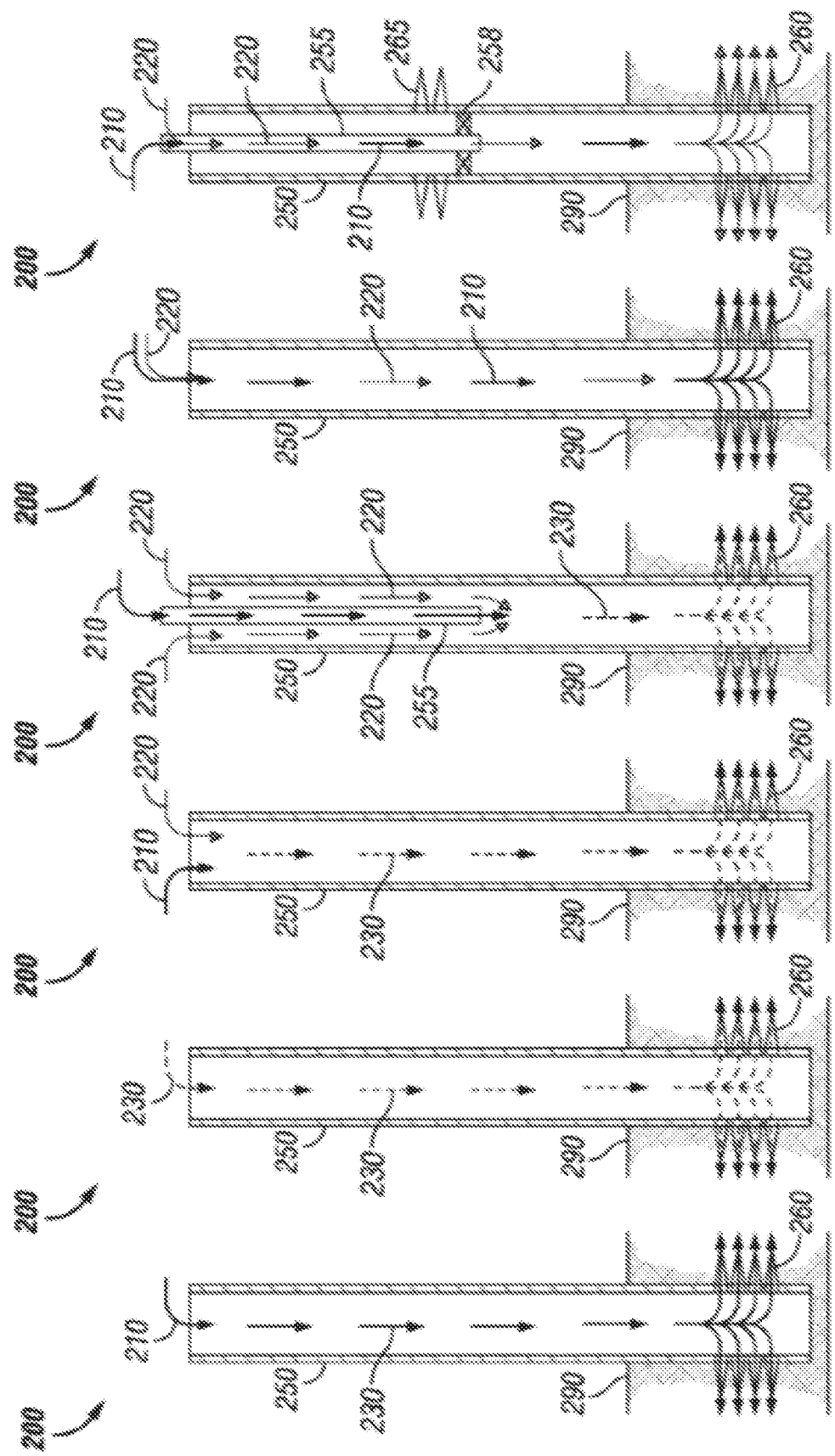

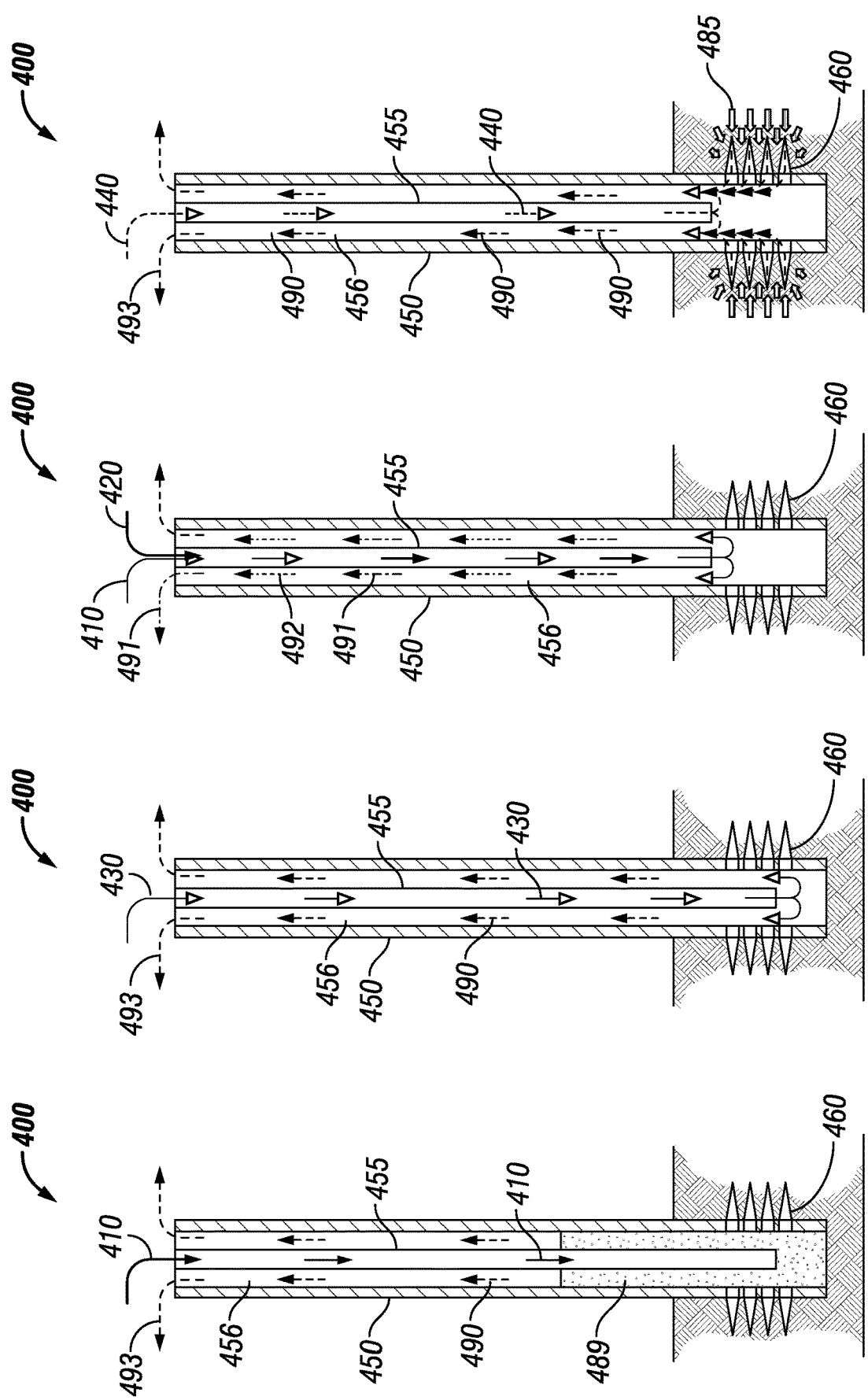

USE OF NATURAL GAS AS A VAPORIZING GAS IN A WELL INTERVENTION OPERATION

BACKGROUND

Well interventions are operations undertaken on oil or gas wells which alter the state of the well or wellbore, diagnose the well performance, or manage the production of the well. Well intervention operations can be applied to wells at any time following initial construction can be applied to low rate wells, new wells, injection wells and wells that are no longer producing. Well intervention operations include activities completed within or to the wellbore or surrounding reservoir.

The ability to effectively manage the physical properties and behavior of fluids during well intervention operations is becoming increasingly important. Efficient use of fluids will minimize applied volumes for reduced servicing and disposal costs and environmental impact while reduced or eliminated venting and flaring will reduce toxic emissions and greenhouse gases. Given the challenges with existing approaches to managing fluids used in well servicing operations, it is desirable to provide improvements to such existing approaches.

BRIEF DESCRIPTION OF THE DRAWINGS

For a detailed description of the embodiments of the invention, reference will now be made to the accompanying drawings in which:

FIGS. 8A-8F are schematic illustrations of different configurations for injecting working fluids into a well during a reservoir matrix well servicing operation.

FIGS. 10A-10D are schematic illustrations of some configurations for circulating natural gas and well servicing fluid s into a well during a circulation well servicing operation.

DETAILED DESCRIPTION

Figure 1:
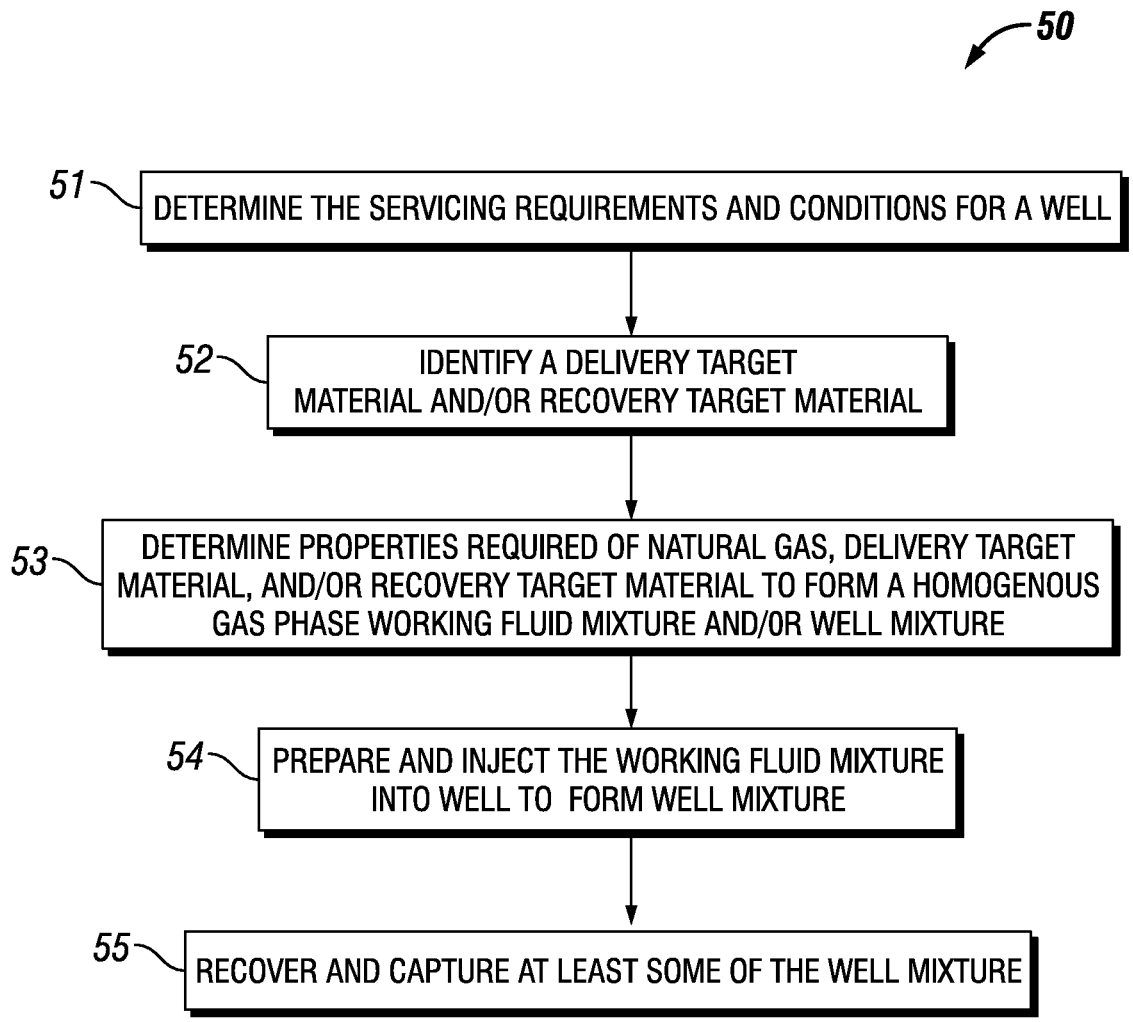
FIG. 1 is a flowchart depicting a natural gas well servicing method, according to one or more embodiments.

The embodiments described herein relate generally to a method for servicing a hydrocarbon well in a well servicing operation (a type of a well intervention operation) using a working fluid to place a liquid phase delivery target material into a well and/or to remove a liquid phase recovery target material from the well, wherein the working fluid can include a selected quantity and composition of natural gas that is used to vaporize the liquid phase delivery target material to form a gas phase homogeneous working fluid and/or to vaporize the liquid phase recovery target material to form a gas phase homogenous well mixture under well servicing conditions (herein referred to as "natural gas well servicing method"). Some embodiments disclose a method of servicing a well comprising injecting the working fluid into the well and contacting the working fluid with a liquid phase recovery target material in the well that is an unwanted substance, thereby vaporizing the unwanted substance and forming a homogeneous gas phase well mixture under specified well servicing conditions, e.g., wherein the natural gas and unwanted substance are in a gaseous phase. The unwanted substance along with at least a portion of the working fluid is then recovered at surface. In some embodiments, the working fluid includes a liquid phase delivery target material that is a treating substance that causes at least one of a physical or chemical change in a recovery target material in the well. The working fluid can include natural gas having a quantity and composition that causes the treating substance to be vaporized thereby forming at least a homogenous gas phase component within the working fluid during the specified well servicing conditions. The working fluid serves to place the delivery target material within a desired location in the well, and to contact the treating substance and natural gas with the recovery target material. At least the resulting homogenous gas phase well mixture is then recovered at surface.

The quantity of natural gas within the gas phase in the working fluid can be sufficient to vaporize between about 10 wt % to about 100 wt % of the delivery or recovery target material. As used in this disclosure, natural gas means methane ($CH_4$) alone or blends containing methane and lesser amounts other compounds, such as, but not limited to, one or more gaseous and/or liquid hydrocarbons and/or one or more natural contaminants, as is typically found in and produced from wells and found in reservoirs. For example, a contaminant can be or include carbon monoxide, carbon dioxide, nitrogen, argon, or any mixture thereof. Natural gas can include about 70 vol %, about 80 vol %, or about 90 vol % to about 95 vol %, about 97 vol %, about 99 vol %, or about 100 vol % of methane and can include 0 vol %, about 1 vol %, about 3 vol %, or about 5 vol % to about 10 vol %, about 20 vol %, or about 30 vol % of one or more other compounds. For example, natural gas can include about 70 vol % to about 100 vol %, about 70 vol % to about 99 vol %, or about 80 vol % to about 95 vol % of methane and about 0 vol % to about 30 vol %, about 1 vol % to about 30 vol %, about 5 vol % to about 20 vol % of one or more of ethane ($C_2H_6$), propane ($C_3H_8$), butane ($C_4H_{10}$), pentane ($C_5H_{12}$), longer chain hydrocarbons, isomers thereof, or any mixture thereof.

Natural gas composition varies widely depending upon its source and degree of processing. Raw natural gas may contain significant quantities of naturally occurring contaminants, including carbon dioxide, nitrogen, hydrogen sulfide, hydrogen, oxygen, or any mixture thereof and each contaminant can have a concentration up to 50 vol %. Further, it may contain water vapor to saturation often at levels exceeding 100 mg/m³. Comparably, processed natural gas is much less variable in composition. Contaminants are typically removed to almost trace levels as are the longer hydrocarbon chains of $C_5+$. Processed natural gas can include about 87 vol % to about 97 vol % of methane, about 1.5 vol % to about 7 vol % of ethane, about 0.1 vol % to about 1.5 vol % of propane, about 0.01 vol % to about 1 vol % of butanes, about 0.01 vol % to about 1 vol % of pentane, less than 0.06 vol % of each longer chain hydrocarbon. Processed natural gas can include nitrogen gas at a concentration of up to 15 vol %, for example, about 5 vol % of less of nitrogen gas. Processed natural gas can include carbon dioxide at a concentration of up to 2 vol % and trace amounts of oxygen, hydrogen, hydrogen sulfide, or any mixture thereof. Processed natural gas can include water at a concentration of less than 32 mg/m$^3$. Processed natural gas can have a heating value of about 36 MJ/m$^3$ to about 40 MJ/m$^3$ on a dry basis. The most consistent processed natural gas is liquefied natural gas (LNG). Within North America, LNG can include 95 vol % or more of methane and less than 5 vol % total of ethane, propane, butane, or any mixture thereof, and only trace amounts of pentane and longer chain hydrocarbons. Nitrogen may be present in small quantities, less than 2 vol %, with carbon dioxide and water present at less than 50 ppm. Internationally, LNG may contain less than 85 vol % of methane with up to 15 vol % of ethane, over 2 vol % of propane and 1.5 vol % of butanes, and only traces of pentane and longer chain hydrocarbons. Again, nitrogen may be present in small quantities, less than 1 vol %, with carbon dioxide and water present at less than 50 ppm. LNG is a cryogenic liquid typically stored at −160° C. and near atmospheric pressure, usually not to exceed 700 kPa. Natural gas has a critical temperature of about −80° C.

As used in this disclosure, the delivery target material means a treating material to be placed within a well during a well servicing operation, and the recovery target material means a material to be removed from the well during a well servicing operation, including unwanted materials. The working fluid can be or include at least the natural gas component of the working fluid and the delivery target material and is in a homogenous gas phase under the specified well servicing conditions. The well mixture can be or include at least the natural gas component of the working fluid and the vaporized delivery target material and is in a homogenous gas phase under the specified well servicing conditions.

The delivery target material can be a well treating substance comprising chemicals or materials in liquid phase selected for placement within, or to assist with, mobilization of pre-existing materials in the wellbore or reservoir. This is accomplished by loosening, dispersing, reacting or in some manner altering the state of the material contained within the well and to be removed. Alternatively, the treating material may be selected for placement within, or to assist with, consolidation of materials, or to accomplish plugging or isolation within the wellbore or reservoir. Treating chemicals or treating materials, referred to collectively as the treating material, include water, aqueous solutions of salts, water soluble organic materials, acids and acid blends, hydrocarbon liquids, natural gas, natural gas liquids, hydrocarbon solvents, biocides, gellant breakers, pH buffers, pH control, clay stabilizers, crosslinkers, gellant viscosifiers, friction reducers, non-emulsifiers, surfactants, scale inhibitors, coated proppant activators, anti-sludge agents, asphaltene modifiers, corrosion inhibitors, defoamers, demulsifiers, foaming agents, hydrogen sulfide scavengers, iron control agents, iron sequestering agents, neutralizing agents, scale removers & inhibitors, solvents, mutual & miscible solvents, wax dispersants & solvents, all of which are known in the art of well servicing treating materials.

The recovery target material can be or include an aqueous, organic or hydrocarbon liquid or mixtures thereof. Water or aqueous-based servicing liquids include aqueous solutions which may contain dissolved components such as salts, acids (inorganic and organic), organics and alcohols. Organic liquids include alcohols, ketones, esters, amides, aldehydes, carboxylic acids and amides. Hydrocarbon liquids can be or include any hydrocarbon in a liquid state containing alkanes, alkenes and or aromatics. The hydrocarbon compositions may include hydrocarbons or hydrocarbon blends having linear or cyclic carbon chain lengths primarily from two carbons, $C_2$, through to fifty carbons, $C_{50}$. Preferentially, injected hydrocarbon liquids will be of a composition such that the volatility will be suitable for completion of safe well servicing operations, such as those liquids with volatility below a Reid vapor pressure of 2 psi. Alternatively, higher Reid vapor pressure liquids or liquefied petroleum gases may be applied; however special equipment or procedures may be required for safe application. Further, the preferential hydrocarbon liquid will not contain detrimental quantities of asphaltene, bitumen or paraffin which may have adverse effects to the wellbore, reservoir or servicing operation.

FIG. 1 is a flowchart depicting a natural gas well servicing method 50 that can be used to vaporize a delivery target material in a working fluid and/or a recovery target material in a well mixture, according to one or more embodiments.

At 51, the natural gas well servicing method 50 can include determining a well servicing requirement and certain well servicing conditions within a well that can include a wellbore and a reservoir.

At 52, the natural gas well servicing method 50 can include identifying a delivery target material and/or recovery target material.

At 53, the natural gas well servicing method 50 can include determining certain properties of natural gas and the delivery target material required to form a working fluid mixture having a homogenous gas phase during the well servicing requirement and at the well servicing conditions, and/or determining certain properties of natural gas and the recovery target material required to form a well mixture having a homogenous gas phase during the well servicing requirement and at the well servicing conditions.

At 54, the natural gas well servicing method 50 can include preparing the working fluid having the determined properties and injecting the prepared working fluid into the well to contact and vaporize the recovery target material and form the desired homogenous phase well servicing mixture at the servicing conditions.

At 55, the natural gas well servicing method 50 can include recovering and capturing a recovery stream at determined recovery conditions and which can include at least a portion of the well mixture. The well servicing requirements can include delivering a treating substance (the delivery target material) to a location in the well, and/or a recovering an unwanted substance (the recovery target material) in the well. The well servicing conditions can include: reservoir temperature and pressure, reservoir fracturing pressure, surface recovery pressure, servicing depth and wellbore configuration and geometry. The determined properties of the natural gas include the quantity and composition of the natural gas, the determined properties of the delivery and recovery target materials include the saturation content of the treating substance and/or unwanted substance within the gas phase of the natural gas working fluid.

The recovering and capturing of the recovery stream can be done under recovery pressure and temperature conditions and may result in at least some components of the recovery stream to condense and separate from the homogeneous gas stream. Should at the recovery conditions, the complete recovery stream can be in a homogenous gas phase and of suitable composition for capture, the stream can be directed to pipeline or facility without separation. Otherwise, at surface and under the recovery conditions, the recovery stream is separated into two or more phase streams, namely: gas phase, hydrocarbon liquids phase, aqueous phase and solid phase. The gas phase is expected to be or include injected and reservoir natural gas accompanied by at least a portion of the vaporized target recovery material or its reaction product gases. The injected natural gas quantity within the natural gas working fluid may be selected to ensure the recovered gas stream content is suitable to meet the pipeline or facility inlet composition specification or pressure. The hydrocarbon fluid phase is expected to contain mostly hydrocarbon and applied hydrocarbon soluble materials, including: hydrocarbon based servicing liquids, treating substance, well material, reaction products, reservoir materials and hydrocarbons condensed from the recovered gas stream. Similarly, the aqueous phase will contain all of the applied aqueous and aqueous soluble materials and condensed aqueous liquid resulting from the well servicing operation. The recovered solid phase can be or include those solids not dissolved or chemically consumed, or those solids generated or entrained during the well servicing operation.

Referring to FIGS. 2 to 6, the composition and quantity of the delivery target material in the working fluid mixture and the recovery target material in the well mixture, the well contents, and the reservoir fluids, along with the composition and quantity of natural gas, in conjunction with the servicing injection and recovery conditions can be manipulated to create the desired behaviors of the working fluid and well mixture during the well servicing steps. In some embodiments, the quantity and composition of the natural gas can be selected so that under the servicing pressure and temperature at the location in the well where the working fluid deposits a delivery target material, the natural gas and delivery target material working fluid mixture is in the condensing vapor-gas or vapor-gas part of the working fluid mixture's phase envelop. This will result in the working fluid mixture containing a homogenous gas phase. In some other embodiments, the quantity and composition of the natural gas can be selected so that under the servicing pressure and temperature at the location in the well where the working fluid contacts a recovery target material, the natural gas and recovery target material well mixture is in the condensing vapor-gas or vapor-gas part of the well mixture's phase envelop. This will result in the well mixture being in a homogenous gas phase. Notably, gas or vapor phase homogeneous mixtures are well known to exhibit unique properties such as very low density, very low viscosity or near zero capillary forces to permit ease of placement into and recovery from wells during servicing operations. In other embodiments, the quantity and composition of the natural gas can be selected so that at the location in the well where the working fluid initially places a delivery target material in the homogeneous gas phase, and under the servicing, shut in or recovery conditions the natural gas and delivery target material working fluid mixture is within the mixture phase envelop, below the dew point, to condense and thereby effect delivery of a liquid phase delivery target material within the well. In a further embodiment, the quantity and composition of the natural gas and the surface recovery conditions are selected so that at surface under the recovery conditions, the recovered well mixture is within the mixture phase envelop to condense the recovery target material from the homogeneous gas phase to minimize potential contamination of the recovered gas stream to a composition suitable for capture.

In other words, the properties of the natural gas can be manipulated to define at least a homogeneous gas phase of a working fluid mixture containing natural gas and a target delivery material and/or a well mixture containing natural gas and a target recovery material having a phase envelope wherein the servicing pressure and temperature at which the working fluid mixture and/or the well mixture exists is above the dew point pressure and critical temperature of the respective working fluid and/or well mixture. Further, at reduced pressure and temperature conditions, those working fluid mixtures can cause a target delivery material or target recovery material to condense and separate from the homogeneous gas phase; within the reservoir, wellbore or at surface.

Figure 2:
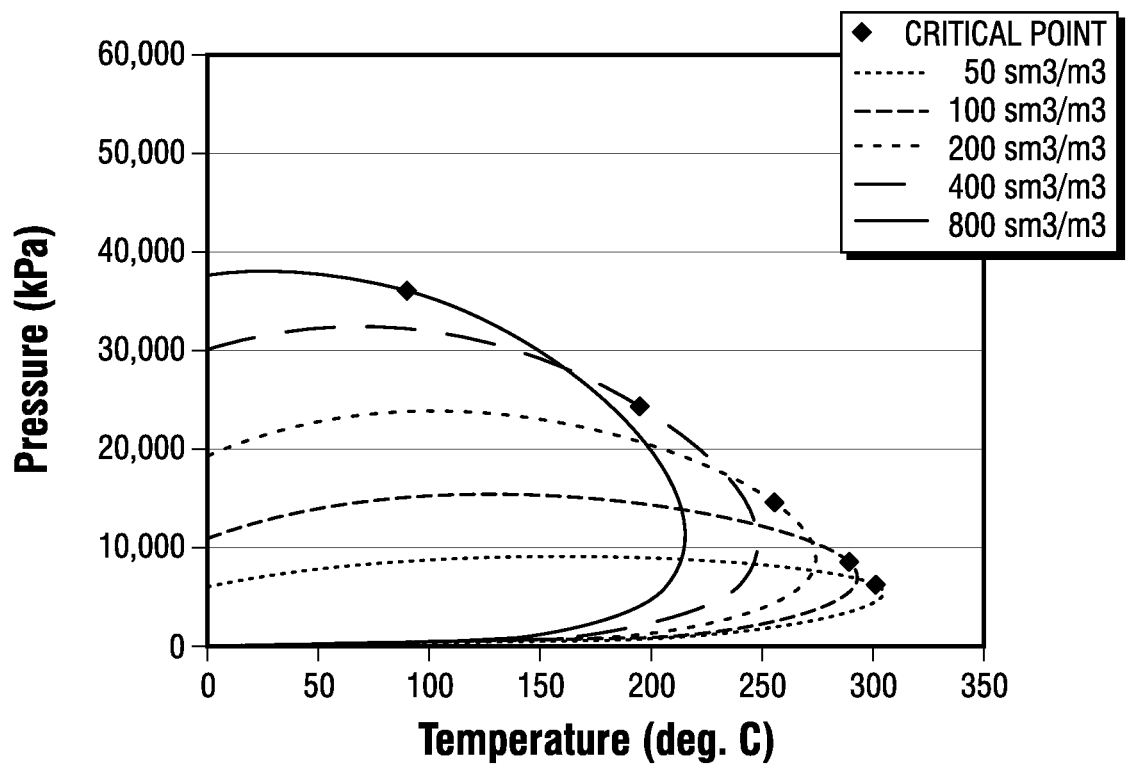
FIG. 2 is a graph of phase envelopes of mixtures comprising 760 kg/m3 hydrocarbon recovery target material with different gas ratios of natural gas.
Figure 3:
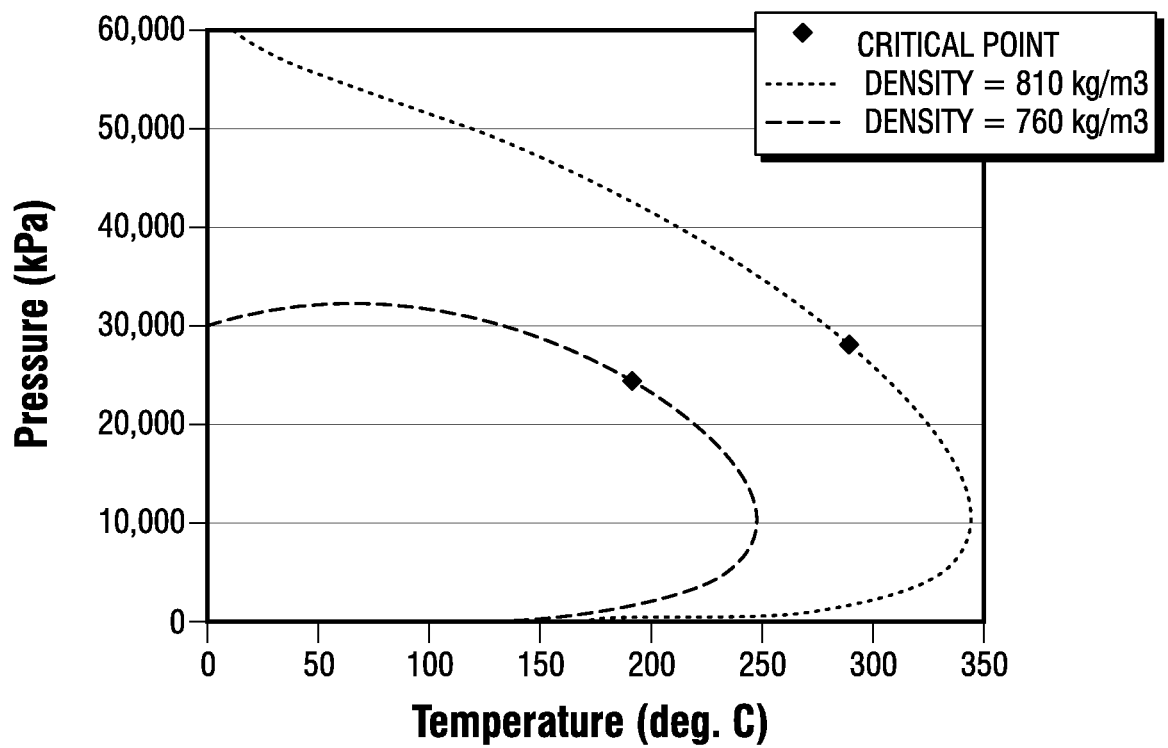
FIG. 3 is a graph of a phase envelopes of mixtures having different hydrocarbon densities and a natural gas ratio of 400 $sm^3/m^3$.

As can be seen in FIG. 2, different applied volumes of natural gas (for example, ranging from 50 $sm^3/m^3$ to 800 $sm^3/m^3$) relative to a certain density of a hydrocarbon recovery target material (for example, 760 $kg/m^3$) will produce well mixtures with different phase envelopes. Similarly, and as shown in FIG. 3, different densities of a hydrocarbon recovery target material (having an exemplary density range from 760 $kg/m^3$ to 810 $kg/m^3$) relative to a certain applied volume of natural gas (for example, 400 $sm^3/m^3$) will produce well mixtures having different phase envelopes. The phase envelopes (shown in FIGS. 2 and 3) illustrate the dew point pressures for the well mixture when at temperatures above the critical temperature. Above the dew point pressure the well mixtures exist as a gas or vapor without a liquid phase present, e.g., in a homogenous gas phase.

Figure 4:
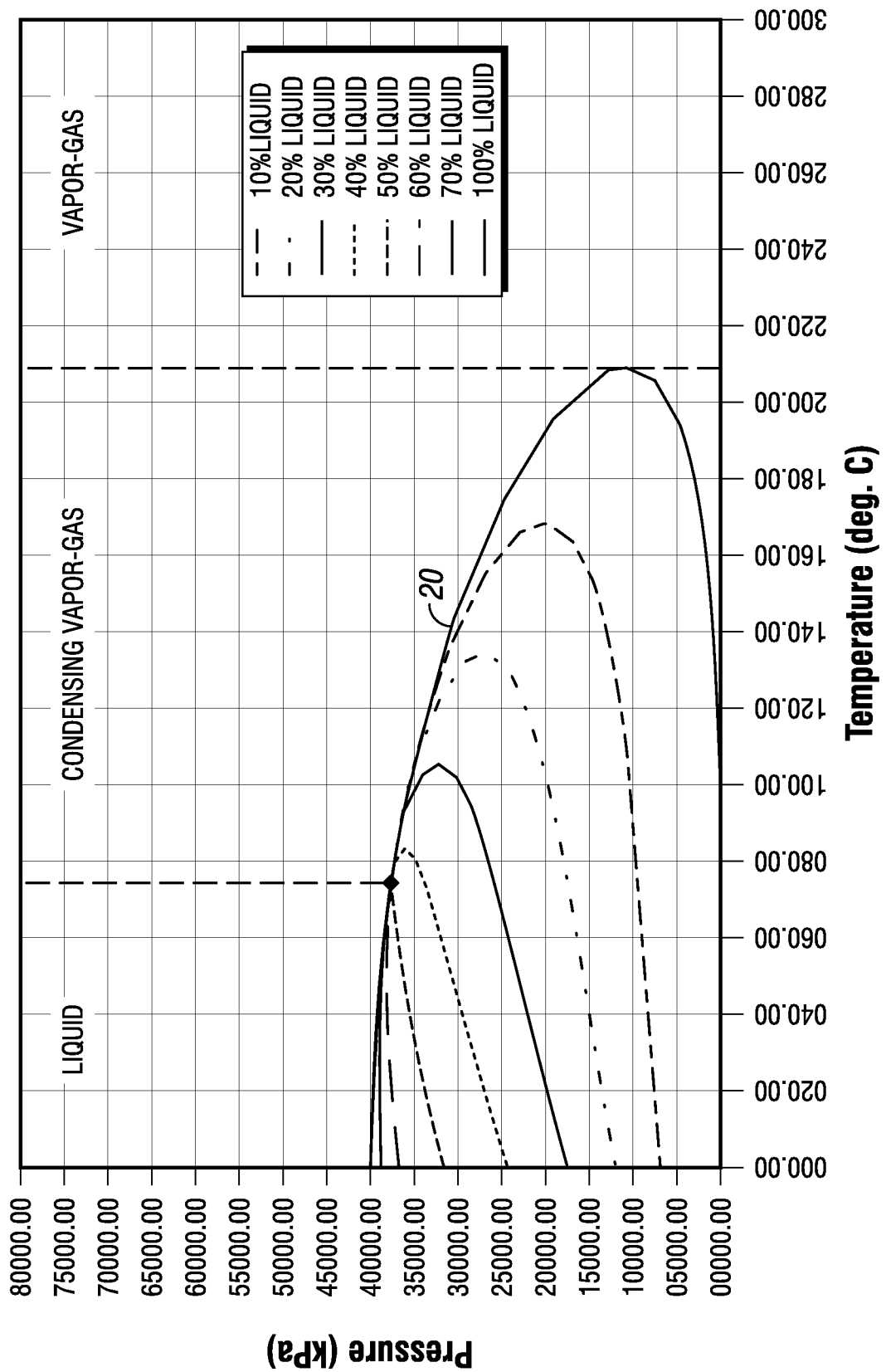
FIG. 4 is a graph of a phase envelope of a mixture having a 760 $kg/m^3$ hydrocarbon at 875 $sm^3/m^3$ gas ratio.
Figure 5:
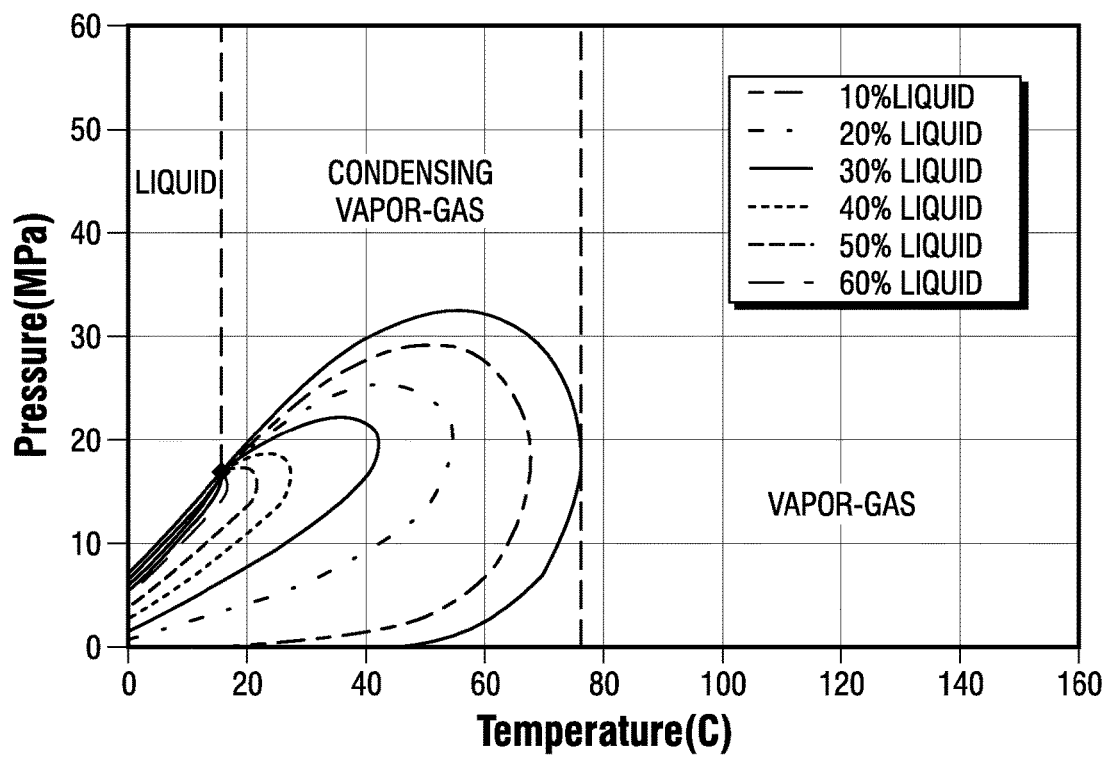
FIG. 5 is a graph of a phase envelope of a mixture having a hydrocarbon liquid density of 625 $kg/m^3$ and a natural gas ratio of 950 $sm^3/m^3$.

When the servicing conditions at the location where the recovery target material is to be removed are determined, a suitable composition of the well mixture can be determined which will result in the target material and the natural gas within the well mixture being in a homogenous gas phase at these servicing conditions. FIGS. 4 and 5 illustrate how the behaviors of hydrocarbon mixtures within wellbores and reservoirs are significantly impacted by the presence of natural gas and can alter one or more of the viscosity, interfacial tension, density, volume and phase state. Further, the selection of the hydrocarbon liquid composition and the quantity of natural gas added can further significantly alter behavior and properties of the resulting mixture. In this manner the addition of a selected quantity and composition of natural gas can be combined with a hydrocarbon liquid (the delivery or recovery target material) to form a homogenous gas phase mixture at the right servicing conditions.

FIG. 4 shows a phase envelope of a mixture comprising 760 $kg/m^3$ hydrocarbon with 875 $sm^3/m^3$ dissolved natural gas. FIG. 4 also shows plot lines showing the volume percent of liquid that exists at various temperatures and pressures within the mixture's phase envelope. At a given temperature, the impact of pressure to phase state and dissolving or releasing natural gas is seen. Also illustrated is the critical point as the diamond shaped marker on the phase envelop at the termination of the 50% liquid quality line at about 37 MPa and 73° C. At temperatures below the critical point, such as 60° C., and pressures greater than 38,500 kPa the mixture is under-saturated and exists as 100% liquid illustrating the fully soluble behavior of natural gas. At temperatures above the critical temperature, such as 100° C., and when above the dew point pressure at about 35,400 kPa, the mixture exists as a vapor to create a vapor phase servicing fluid. With a comparatively minimal pressure drop, such as to 34,800 kPa, some liquid condenses from the vapor resulting in about 30% by volume liquid in equilibrium with about 70% volume vapor and for example, permitting release of a hydrocarbon based delivery material from a homogeneous gas phase working fluid initially above the dew point. As pressures decrease, the liquid may then re-vaporize as is typical where at 10,200 kPa a 10% liquid volume with 90% gas volume mixture exists. In other words, a well mixture having 760 kg/m$^3$ hydrocarbon with 875 sm$^3$/m$^3$ natural gas dissolved can be used in the natural gas well servicing method when the determined servicing pressure and temperature are outside of the phase envelope of this mixture (as defined by dew point line 20), as these servicing conditions will result in the well mixture being in a homogenous condensing vapor-gas phase or a homogenous vapor-gas phase. Further, that mixture, when experiencing a pressure or temperature reduction, can condense at least a portion of the previously vaporized hydrocarbon.

With high gas ratios and increasingly lighter hydrocarbon liquids, the addition of natural gas to the recovery target material (or to a delivery target material) will result in mixtures with behaviors similar to retrograde condensates or natural gas liquids at most servicing conditions; the fluid at least initially exists only in vapor phase. FIG. 5 illustrates a typical mixture phase envelop for a high gas oil ratio within a light hydrocarbon, e.g., having a liquid density of 625 kg/m$^3$ and a gas ratio of 950 sm$^3$/m$^3$. This mixture has a critical temperature at about 16° C. which is much lower than the servicing temperature in many wells. Similar to the phase envelope shown in FIG. 4, above the critical temperature and the dew point line the mixture exists as a vapor where liquids initially condense with decreasing pressure. The cricondentherm (the highest temperature at which two phases can co-exist) is seen to be at about 77° C.; a temperature above which the mixture is always in a vapor state. At conditions above the cricondentherm, the behavior is often described as that of a wet gas where liquids can only condense at reduced temperatures such as at surface upon recovery. For example, a well mixture can be created with a recovery target material that can be or include a light hydrocarbon combined with a high natural gas content to create a homogenous vapor phase that will remain as a gas at all pressures and only condense with a reduction in temperature.

Figure 6:
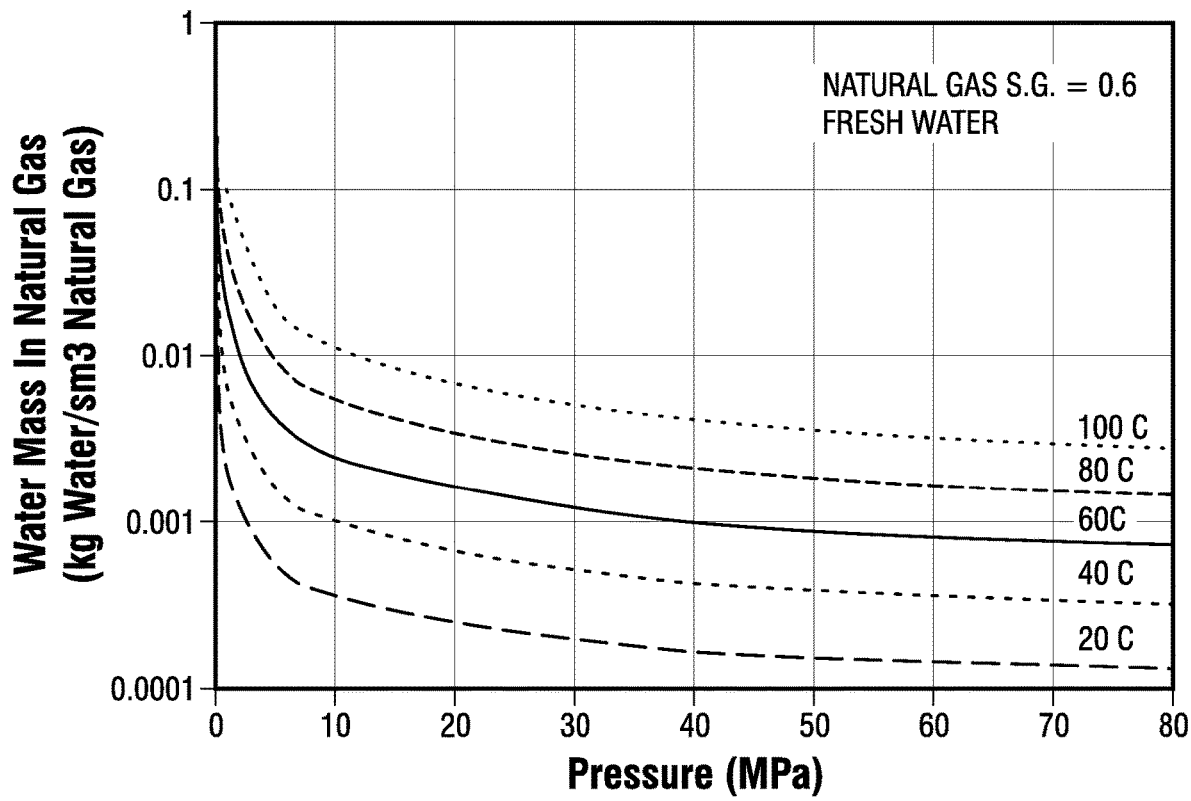
FIG. 6 is a graph showing curves of water content and saturation in natural gas at different temperatures.

Referring now to FIG. 6, natural gas that is highly under-saturated with water vapor (e.g., when sourced from LNG) and upon contact with aqueous based liquids, will capture the aqueous liquid to the gas phase until equilibrium conditions are reached and the natural gas is water saturated. FIG. 6 illustrates the saturated fresh water content in a 0.6 specific gravity natural gas at common well servicing pressures and temperatures. For example, the water content of sales quality natural gas is typically less 65 mg/m$^3$ while LNG is virtually water free (less than 50 ppm). However, the equilibrium content of water in natural gas is comparably significant, for example 2,500 mg/m$^3$ at common application conditions of 15,000 kPa and 70° C. This permits the natural gas well servicing method to be used in a well drying operation, wherein the working fluid can be used to vaporize water in the well (the recovery target material).

Figure 7:
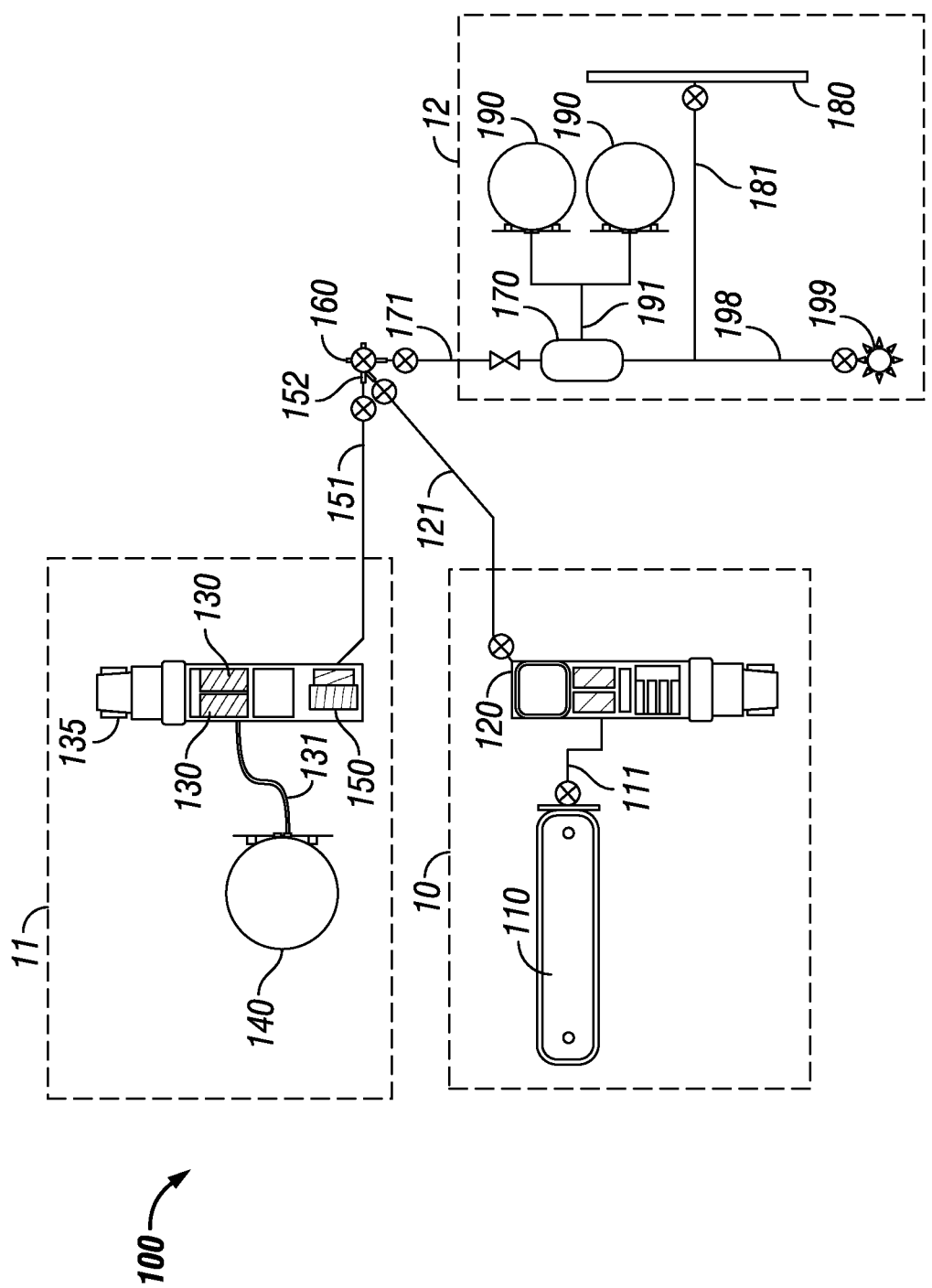
FIG. 7 is schematic of a well servicing system for injecting and recovering a working fluid containing natural gas into a wellbore or underground formation of a well.

Referring now to FIG. 7, the natural gas well servicing method can be completed using well servicing equipment 1.

More particularly, FIG. 7 illustrates one configuration of well servicing equipment for applying, recovering and capturing a natural gas and well servicing liquid stream in a closed system well servicing operation. The well servicing equipment 100 includes the preparing and pressurizing equipment 11 that can include servicing liquid tank 140 that contains the liquid servicing fluid; a well servicing utility unit 135 that contains and applies the treating material stored in one or more mounted treating material tanks 130 (two are shown in FIG. 7). The servicing liquid from servicing liquid tank 140 and treating material from treating material tank 130 may be combined within the well servicing utility unit 135 to form a prepared fluid then fed to a mounted service pump 150, again within the well servicing utility unit 135, where the well servicing fluid is pressured to well servicing injection pressure. The servicing liquid tank 140 is fluidly coupled to the treating material tank 30 by liquid conduit 131.

The well servicing equipment 100 also includes natural gas preparation equipment 10 that can include mobile storage vessel 110 that can store the natural gas in a liquefied state (e.g., LNG); a LNG servicing pumper 120 that pressurizes the LNG to well servicing conditions and then heats the LNG to a desired injection temperature. The mobile storage vessel 110 is fluidly coupled to the LNG servicing pumper by an LNG conduit 111.

The well servicing equipment 100 also includes a component 152 for alternately injecting or combining the prepared fluid (via conduit 151) and the gaseous natural gas stream (via conduit 121) to form the working fluid and directing this working fluid mixture to a wellhead 160. In this manner the working fluid containing sufficient natural gas to vaporize between 10 wt % to 100 wt % of the delivery target material and/or of the recovery target material is prepared and injected into the wellbore of a well (not shown) and optionally into a reservoir of the well (not shown) to undertake the servicing operation.

With continued reference to FIG. 7, a flow back system 12 is provided to process and capture a well servicing effluent stream received from the wellhead 160 via conduit 171. A four phase separator 170 coupled to the conduit 171 separates recovered gases from a recovery stream containing injected and native natural gas, solids and liquid streams. The recovered liquids are further separated within the separator 170 between aqueous and non-aqueous streams, including a well servicing fluid, resulting treating material liquids and produced native reservoir liquids, and are directed to closed liquids recovery tanks 190 via a liquids conduit 191. Liquids recovery may or may not involve a tank; rather they can be directed to a liquids suitable pipeline (not shown) for processing should that facility exist. Recovered solids may be captured within the separator 170 and require periodic removal as they accumulate. The recovered gases from separator 170 including the applied natural gas and produced reservoir gases, are directed to a gas pipeline 180 via a gas conduit 181, where they are directed to a facility (not shown) for processing, sale or re-use. In this or a similar manner, an environmentally closed well servicing system can be created and applied permitting well servicing operations to be completed without venting or flaring to a flare 199 via conduit 198.

The well servicing injection, circulation and flow back operations in accordance with at least one embodiment will now be described with reference to FIGS. 8A-8F, 9A, 9B, and 10A-10D.

Referring now to FIGS. 8A-8F, a number of different injection configurations can be used to form a working fluid 230 and inject the working fluid into a wellbore 250 of a well 200 during a matrix well servicing operation. In a first injection configuration as shown in FIG. 8A, the working fluid 230 can be or include a 100% natural gas stream 210 supplied by the natural gas preparation equipment 10. In a second well injection configuration as shown in FIG. 8B, the working fluid 230 can be or include a mixture of the natural gas and the well servicing fluid that are combined prior to the working fluid being injected into the wellbore 250. In a third well injection configuration as shown in FIG. 8C, the working fluid 230 is formed in the wellbore 250 from the concurrent injection of the natural gas stream 210 and a well servicing fluid 220 into the wellbore 250 wherein the well servicing fluid can be or include a well servicing liquid and optionally a delivery target material (herein collectively referred to as "well servicing fluid" even if the delivery target material contains solid phase material). In a fourth well injection configuration as shown in FIG. 8D, a tubular conduit 255 is provided within the wellbore 250; the tubular conduit 255 may be a temporary working conduit such as provided by coiled tubing. The natural gas stream 210 is injected into tubular conduit 255; concurrently, the well servicing fluid 220 is injected into the wellbore 250 outside of the tubular conduit 255 and mixes with the natural gas at a discharge end of the tubular conduit 255 in the wellbore 250 to form the working fluid 230. In a fifth well injection configuration as shown in FIG. 2(e), the natural gas stream 210 is injected into the wellbore 250 with well servicing fluid 220 in a sequential manner to minimize mixing within the wellbore 250 or reservoir 290. In a sixth well injection configuration and as shown in FIG. 8F, the tubular conduit 255 is inserted into the wellbore 250 and is hydraulically isolated at least at one point using one or more packers 258; the natural gas stream 210 and well servicing fluid 220 can then be sequentially injected through the tubular conduit 255 into the wellbore 250 (as shown in FIG. 8F); alternatively, a working fluid 230 comprising 100% natural gas or comprising a mixture of natural gas and well servicing fluid can be injected through the tubular conduit 255.

In each of the injection configurations shown in FIGS. 8A-8F, the working fluid 230 is injected into the wellbore 250 and in some cases also through perforations 260 in the well and into a reservoir 290 of the well. The working fluid 230 mixes with a recovery target material (not shown) contained within one or more of the wellbore 250, the perforations 260 and the reservoir 290 to form a homogenous gas phase well mixture. In each of the well injection configurations shown in FIGS. 2A-2F, multiple conduits (not shown) can exist within the wellbore 250 that are configured for injection and multiple distinct reservoirs (not shown) or multiple points within a distinct reservoir can hydraulically communicate with the wellbore 250, e.g., a horizontal wellbore. Hydraulic communication between the wellbore 250 and the reservoir 290 may be provided by methods known within the industry including perforations, slots, liners, sliding sleeves and screens.

Figure 9A:
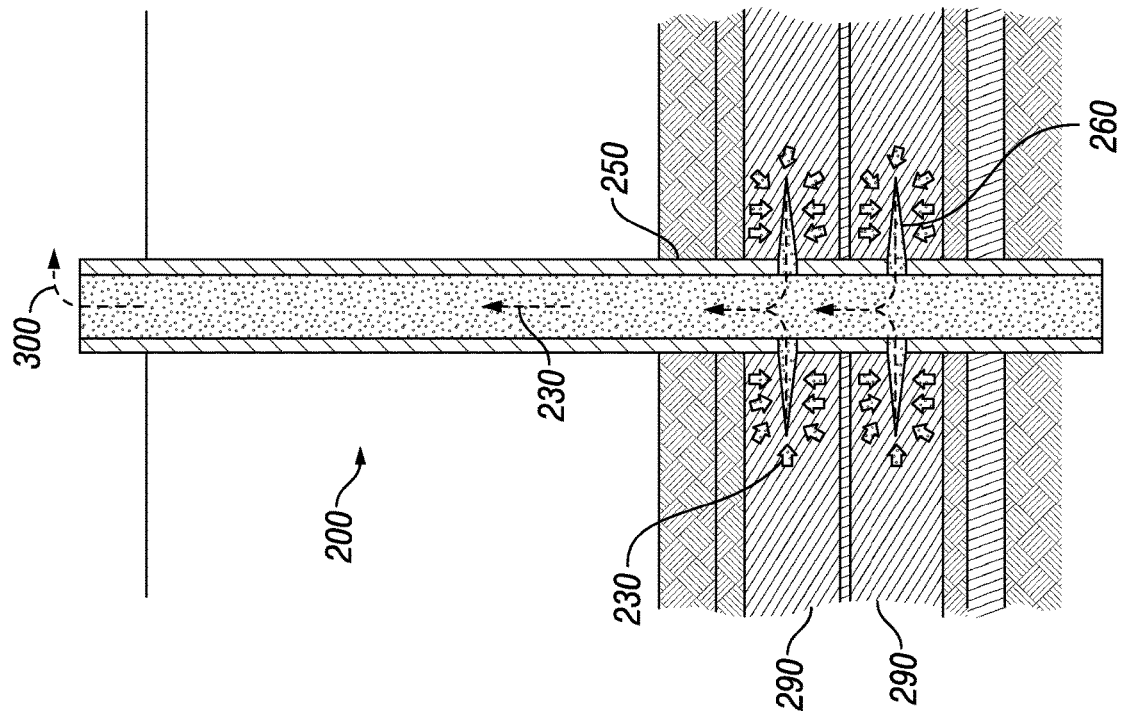
FIGS. 9A and 9B are schematic illustrations of injection and recovery sequences during a matrix well servicing operation.
Figure 9B:
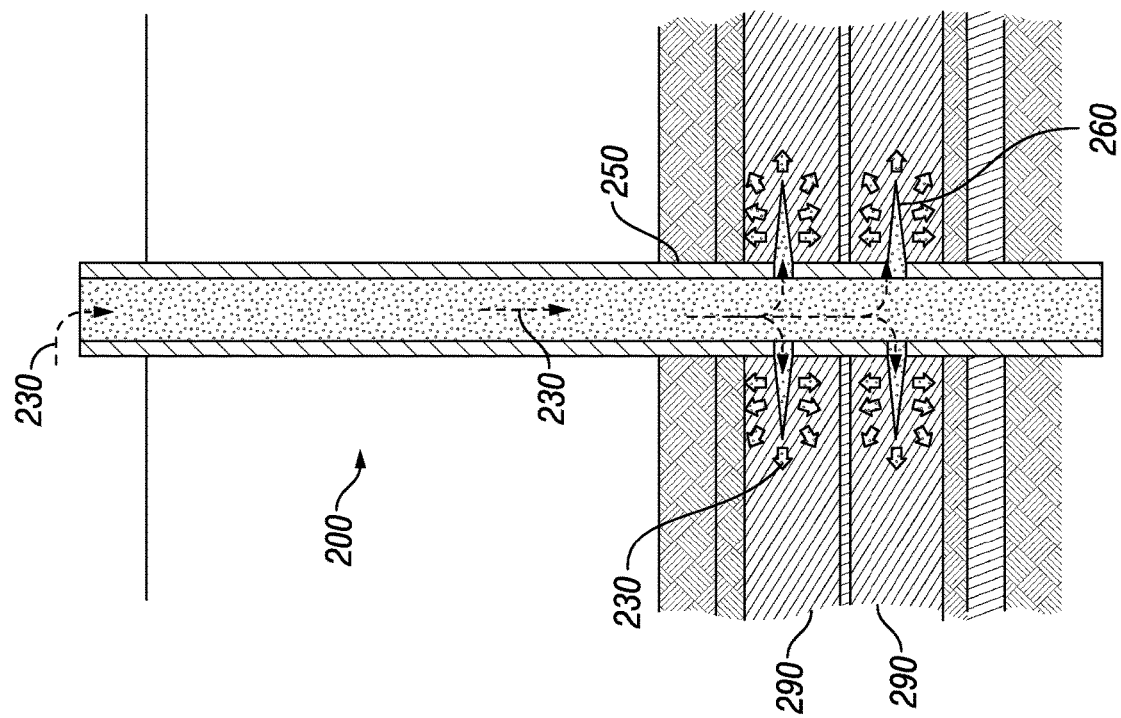

Referring now to FIGS. 9A and 9B, after the working fluid 230 has been injected into the wellbore 250 and/or reservoir 290 of the well 200, at least the homogenous gas phase well mixture is recovered to surface. FIG. 9A illustrates a well servicing injection operation into the well 200 can include the wellbore 250, perforations 260 and a reservoir 290. The working fluid 230 enters the wellbore 250 and flows through the perforations 260. From perforations 260 the working fluid 230 moves through the permeations in the reservoir 290 and occupies the pores, fissures and/or fractures within the reservoir 290. Within the pores the injected working fluid 230 will at least displace and mix with native reservoir fluids and other contained materials and potentially contact the reservoir rock forming the matrix. Should unwanted materials be present, such as perforating fines, rock fines, mobilized clays, waxes, emulsions, precipitates, the formation rock itself or contaminating gases, the natural gas working fluid 230 will displace, mix, contact and potentially vaporize those unwanted materials as well. Placement of a treating substance or well servicing liquid delivered as a homogeneous gas phase vapor is particularly effective for placement within the well as a gas or vapor; gas phase viscosity is significantly less than liquid phase viscosity to reduce resistive flow effects, and gases will readily enter the smallest of pores and fissures within the reservoir due to minimal capillary pressure effects to maximize contact. Further, liquid phase unwanted materials (e.g., recovery target material) will be vaporized by the natural gas to form the homogenous gas phase well mixture to permit easy recovery flow with little effect from reservoir resistive effects. A selected treating material for the unwanted material(s) as is known in the art can be included within the injected working fluid 230, and cause the unwanted material(s) to react, dissolve or in some manner vaporize and be entrained into the gas phase of the injected working fluid 230. Upon injecting sufficient working fluid 230 to contact the desired pores within the reservoir 306, injection is stopped and any treatment material in the working fluid 230 is left in place for a sufficient time to achieve a desired effect on the unwanted material(s), e.g., completion of chemical reaction, dissolution of solids, mixing of liquids, diffusion between phases, phase change, evaporation or condensation.

Treating materials known in the art are selected to remain at least in part within the reservoir 290 or wellbore 250 following completion of the well servicing operation may be placed into the well 200 using the working fluid 230; in such case these treating materials are considered a delivery target material. The treating materials are selected to remain for a time within the reservoir 290, perforations 260 or wellbore 250 to complete a temporary or longer term beneficial purpose; such as wax crystal modifiers to reduce wax deposits, scale inhibitors to reduce scaling, and reservoir plugging materials to reduce water production. Delivery target materials placed into the well within the homogeneous gas phase of a working fluid, and subsequently during a reduced pressure step such as while stopping injection, shutting in the well or beginning recovery, at least a portion of the delivery target material may be caused to condense and separate from the working fluid to effect delivery of a liquid phase target material from a vapor phase placement. In this manner the working fluid 230 may be applied to the well servicing operation to efficiently place natural gas alone as a treating material or along with selected treating materials into the wellbore 250 or the reservoir 290 matrix or to cause removal of unwanted materials from the wellbore 250 or the reservoir 290 matrix. Further, use of natural gas as a homogeneous gas phase carrier or displacement fluid improves control of hydrostatic pressures during the injection operation to ensure injection rate control improving placement efficiency. Upon completing the injection phase of the well servicing operation, the well may be flowed to remove the components to be recovered from the well servicing operation.

Further, injection of the working fluid 230 may be completed into the matrix of a reservoir 290 for the purpose of pressuring the reservoir 290 to achieve a desired effect or as a means to assess the injection, flow capacity or in some way evaluate the reservoir. Desired effects achieved by pressuring the reservoir 290 may include improvements in subsequent flow back rates through the reservoir to vaporize and better entrain unwanted materials, a change in phase state of existing fluids or materials within the matrix by pressuring and mixing with injected natural gas to cause vaporization, or alternations of rock stress profiles within the reservoir by the volume and expansion provided by the added natural gas.

Referring now to FIG. 9B, the homogenous gas phase well mixture 300 can be or include at least a portion of the natural gas in the working fluid 230 and vaporized unwanted materials resulting from the servicing operation (e.g., the recovery target material) and native reservoir fluid. In order to begin production of native reservoir fluids, a sufficient amount of the recovery target material within the well mixture is removed from the underground reservoir 290 and the wellbore 250 by opening the well, and flowing a stream of the well servicing mixture 300 ("recovery stream 300") from the underground reservoir 306 through the reservoir matrix and up the wellbore 250 and to a flow back system (not shown).

If sufficient reservoir pressure exists to overcome the capillary and viscous flowing forces holding the fluids in place inside the reservoir 290 (collectively "reservoir resistive effects"), as well as the bottom hole flowing pressure, the recovery stream 300 may flow from the reservoir 290 up the wellbore 250, through any surface flow back equipment and into a processing facility or into a pipeline for flow to a remotely located processing facility (not shown). Notably, gas phase materials beneficially exhibit very low collective reservoir resistive effects as they exhibit very low viscosity and near zero capillary forces. The bottom hole flowing pressure can include frictional losses of the flow from the perforations to surface ("flowing friction pressure"), plus the hydrostatic pressure, plus any surface equipment pressure losses, and the capture system inlet pressure. If the reservoir pressure cannot overcome the existing reservoir resistive effects and bottom hole flowing pressure, a certain amount of natural gas can be added to the working fluid 230 to vaporize the recovery target material providing reduced reservoir resistive effect and lower density for less hydrostatic permitting an increased the wellhead flowing pressure such that the recovery stream 300 can overcome any surface flow back equipment pressure losses and still have a sufficient pressure at the capture system inlet to meet inlet pressure requirements for a pipeline or processing facility. More particularly, a homogeneous natural gas component in the working fluid serves to reduce or eliminate the liquid content placed into the reservoir 290 during the servicing operation, to expand upon opening the well 200 to maintain pressure to drive fluids from the reservoir matrix, and, by reduction or elimination of liquids in the returning flow stream, reduce the density and hence the hydrostatic pressure of the fluids flowing in the wellbore 250. The liquid content can be optionally reduced to a level which meets pipeline and processing facility compositional requirements, or at least to a level which can be captured by closed storage tanks, thereby avoiding the need to expose the liquids to the environment by depositing into open tanks.

Referring now to FIGS. 10A-10D, and according to another embodiment, a well servicing method for circulation operations using a working fluid comprising natural gas is illustrated. Each of the FIGS. 10A-10D shows a different circulation mode of the circulation operation. In each circulation mode, a tubular conduit 455 is inserted into a wellbore 450; the conduit 455 may be a temporary work string such as that provided by coiled tubing. The bore of the tubular conduit 455 defines one fluid flow path, and the annular space 456 defined between wellbore 450 and the tubular conduit 455 defines a second fluid flow path. During circulation operations, perforations 460 may not be in place, be physically isolated from the circulation flow, left open to the wellbore 450 or be temporarily plugged to prevent inflow of the well servicing fluid s to the reservoir.

As shown in FIG. 10A and according to a first circulation mode, a working fluid comprising natural gas 410 is injected into the well with flow within one flow path (injection flow), while fluids displaced from the well flow to surface within the other flow path (return flow) to form a circulation path; either flow path 455, 456 can serve as the injection or return flow. The circulating pressure at any point within the wellbore 450 is determined by the surface injection pressure and temperature, the hydrostatic and friction pressure along the circulation path, and finally the wellhead flowing pressure of the return flow stream. The working fluid 410 is injected down conduit 455 and contacts and vaporizes the unwanted material 489 ("recovery target material") within the wellbore 450 to form the homogenous gas phase well mixture. The recovery target material 489 can be any of a liquid, solid or gas. By contacting, displacing or being forced through the recovery target material 489 from the circulation injection flow, the working fluid 410 will vaporize some of the recovery target material 489, to form the homogenous gas phase well servicing mixture, and this well servicing mixture 490 is recovered to surface as recovery stream 491. By continued injection through conduit 455, the formed well mixture 490 is circulated from the wellbore 450; transporting the vaporized recovery target material 489 up the wellbore 450 with the natural gas and any accompanying liquids through the return conduit 456.

As shown in FIG. 10B and according to a second circulation mode, a working fluid 430 comprising natural gas and at least a treating material is injected into the well through flow path 455 with the return well mixture stream 490 returning to surface through flow path 456. The injection stream may serve to deposit vaporized treating materials ("delivery target material") into the wellbore 450, or alternately to vaporize and remove unwanted materials (not shown, "recovery target material") from the wellbore 450. Suitable treating materials include sulfur dissolving solvents or methanol to prevent hydrate formation. Unwanted materials include hydrates, well servicing liquids or accumulated reservoir liquids.

As shown in FIG. 10C and according to a third circulation mode, the natural gas 410 and a well servicing fluid 420 are injected sequentially into the wellbore 450 through flow path 455 to form the working fluid and the recovery stream 491 is recovered via flow path 456. The well servicing fluid can be or include a well servicing liquid and optionally a treating material. Sequential injection may permit placement of a concentration of the treating material or well servicing liquid of the well servicing fluid 420 with no or little natural gas content such as to improve chemical attack on an unwanted material (not shown), at least to promote vaporization of contacted materials, or deploy a highly viscous sweep fluid to isolate the vaporized materials from other fluids within the well. In one application, following contact with an unwanted material by the treating material and as the well mixture is circulated from the well, mixing of the returning natural gas stream 491 with returning well mixture 492 is encouraged to cause at least the unwanted material to vaporize. This desired mixing is encouraged due to reasons such as a density driven liquid fall back in upward flow. Similarly, gas phase bypass and vaporization in horizontal flow may be expected. However, mixing can be enhanced to at least a certain extent with selected fluid properties and injection rates. Beneficially, alternating injection of the well servicing fluid 420 with natural gas 410 permits control of hydrostatics within the injection flow path 455 and return flow path 456 to manage pressure within the wellbore 450, for example at the perforations. In this manner a desired homogenous gas phase recovery stream is formed within at least the return conduit within the wellbore. When deployed in this manner, the recovery stream comprising the returning homogenous gas phase 491 may contain and serve to transport the greater portion of the vaporized unwanted materials to remove from the wellbore. Alternatively, the return well servicing fluid stream 492 or components thereof may mostly remain within the well as a placed material, or commingle with, to evaporate into, the returning natural gas stream 491.

As shown in FIG. 10D and according to a fourth circulation mode, a working fluid comprising natural gas is injected into the well through injection flow path 455 with the return flow stream 490 flowing via return flow path 456. In this operation, the well servicing operation is conducted such that during the circulation operation the reservoir produces fluids 485. The produced reservoir fluids 485, preferentially containing at least some undissolved and unsaturated natural gas are commingled and mix with the well circulation return stream 490 which may contain unwanted wellbore materials to further vaporize those materials within the well mixture. Further, the produced reservoir fluids 485 may contain unwanted materials or servicing fluids from a previous servicing operation with the servicing operation completed to draw those unwanted materials from the reservoir to be vaporized in the well mixture. As illustrated for the well servicing injection operation, injection of natural gas 410 and the optional well servicing fluid 420 to form a working fluid for circulation operations as illustrated in FIGS. 10A-10D can be completed in any number of wellbore configurations and with the natural gas working fluid formed at surface prior to entering the well or within the well where the components are injected at surface to form a homogenous gas phase well mixture within the wellbore 450. Further, a multiple of conduits can exist within the wellbore configured for circulation and a multiple of distinct reservoirs or multiple points within a distinct reservoir may hydraulically communicate with the wellbore 450; such as in a horizontal wellbore. Hydraulic communication between the wellbore 450 and the reservoir may include those methods known within the industry including perforations, slots, liners, sliding sleeves and screens.

As will be discussed below, there are at least three different embodiments of the method of applying a working fluid comprising natural gas to complete well servicing operations, wherein the well servicing mixture at the application conditions include a homogeneous gas phase well mixture can be or include natural gas and a target material and recovery stages of the well servicing operation include a free gas phase. A first embodiment involves selecting the composition of the working fluid to include a homogenous gas phase mixture of at least natural gas and a delivery target material such that the injected working fluid places the vaporized delivery target material at a location within the well (wellbore or reservoir) during the well servicing operation and contains a free gas phase during the servicing and recovery steps of the servicing operation. A second embodiment involves selecting the composition of the working fluid to include at least natural gas and a treating material such that the injected working fluid mixes with and vaporizes at least one recovery target material in the well (wellbore or reservoir) to form a homogeneous gas phase well mixture and the recovery target material is vaporized and removed during the well servicing operation, and the well servicing mixture contains a free gas phase during the recovery steps of the operation. A third embodiment involves selecting the composition of the working fluid to can be or include 100% natural gas such that the injected working fluid mixes with and vaporizes at least one recovery target material in the well to form a homogeneous well mixture and the recovery target material is removed during the well servicing operation, and the well servicing mixture contains a free gas phase during the servicing and recovery steps of the operation.

A further fourth embodiment relates to well servicing operations using a natural gas and at least a well servicing fluid containing a treating material, wherein the well servicing fluid and the natural gas are injected into the wellbore sequentially and phase mixing between the injected fluids is minimized during the injection phase in order to better maintain the individual behaviors or properties of the natural gas working fluid and injected well servicing fluid permitting a concentrated injected treating material to contact the unwanted material. Wherein, upon recovery the unwanted material or its reaction product is encouraged to mix with and vaporize into the sequentially injected natural gas stream for removal during the recovery step of the operation.

In an additional fifth embodiment, flow from the reservoir is maintained during at least a part of a circulation servicing operation such that the reservoir flow contributes to the return stream to enhance vaporization and removal of unwanted materials from the reservoir or to contribute to or enhance removal from the wellbore of at least the homogeneous gas phase well mixture.

In an additional sixth embodiment, the quantity and composition of the natural gas can be selected so that at the location in the well where the working fluid initially places a material delivered (delivery target material) in the homogeneous gas phase, and under servicing, shut in or recovery conditions, the natural gas and delivery target material containing working fluid mixture are caused to be within the mixture phase envelop to condense and thereby deliver a liquid phase delivery target material within the well.

In a further embodiment, the quantity and composition of the natural gas and the surface recovery conditions are selected so that at surface under the recovery conditions, the recovered well mixture is within the mixture phase envelop to cause condensation of at least a portion of the recovery target material from the homogeneous gas phase to minimize potential contamination of the recovered gas stream to permit a composition suitable for capture.

These embodiments will be described in further detail below.

In order to achieve the desired homogeneous gas phase can include natural gas and the delivery or recovery target material and other desired behaviors of the well mixture during the injection and recovery steps of the servicing operation, the operator should know the relationship between the desired behavior and the saturated quantity of the target material within the natural gas in the mixture at the servicing and recovery conditions; for example, when vaporization of a target material during the servicing operation is desired, the operator should know the quantity of target material that can be vaporized into the natural gas in order to create the desired homogeneous gas phase. Unique saturated content of target material within natural gas exists for each possible composition of the well servicing mixture at the servicing conditions and for the composition at surface recovery conditions. The quantity of vaporized target material within the homogeneous phase of the well mixture can thus be determined by selecting the quantity of natural gas within the natural gas working fluid. For example, to enhance or ensure maximum vaporization, the operator may provide a surplus quantity of natural gas in the well mixture such that as the target material does not approach saturation in the homogeneous gas phase well mixture, if desired. Alternatively, the operator may provide a deficit of natural gas to only vaporize a portion of the unwanted material such that the behaviors of a homogeneous gas phase are provided only to that vaporized portion which may serve for example, to preferentially enter or move through a reservoir matrix, if desired.

First Embodiment

Working Fluid Comprising Natural Gas and a Delivery Target Material to be Placed in a Well During Well Servicing In a first embodiment, the composition of the well servicing mixture at the servicing conditions is selected and a working fluid comprising natural gas and a liquid phase delivery target material is prepared such that the working fluid mixture contains a homogenous gas phase during the servicing operation to place the delivery target material within the wellbore or reservoir of the well, and any well servicing mixture that is formed from a combination of working fluid and a liquid phase recovery target material contains a free gas phase during the recovery steps of the operation. This embodiment is particularly useful for well servicing operations to place treating material within the wellbore where density control is desired to avoid having the treating material enter the reservoir, good dispersion of the treating material throughout a wellbore or into a reservoir by low viscosity is desired, entry of the treating material to the smallest pores and fissures within the matrix by near zero capillary effects is desired, or use of a minimal volume of treating material is desired. Further, the embodiment is useful where at least the gas phase of the recovered surface stream is desired captured at surface; the gas phase is pipeline compatible and the wellhead flow pressure is sufficient to overcome at least the recovery system inlet pressure.

In this embodiment, at common servicing conditions, the natural gas quantity and composition is controlled to ensure that the delivery target material vaporizes into the natural gas to form a working fluid in a homogenous gas phase during the well servicing operation. The natural gas quantity and composition within the working fluid are sufficient to vaporize between 10 wt % to 100 wt % of the delivery target material. The surface injection pressure and temperature are selected so that the desired homogenous gas phase exists within the working fluid to maintain the servicing condition; this state is maintained within the wellbore or reservoir where the material is to be placed separates from the working fluid to remain within the wellbore or reservoir. The working fluid, now mostly devoid of the treating material is then flowed to surface and recovered.

Maintaining the working fluid in a homogenous gas phase during the servicing step is desirable as the gaseous phase permits ready placement of the treating material within the well by its inherent low viscosity and minimal capillary forces. The natural gas within the working fluid, the composition of the natural gas, the composition of the well servicing liquid, the composition of the treating material or combinations thereof are manipulated to maintain the homogenous gas phase of the natural gas and treating material mixture. Separation of the treating material from the injected natural gas working fluid at the servicing conditions may be accomplished by a number of processes such as preferential solubility into a material within the well, or deposition onto contacted materials through diffusion. Dispersion of the treating material within or by homogeneous gas phase behavior into the wellbore or reservoir may allow a smaller quantity of the treating material to be applied, or may provide more efficient or effective coverage of a given quantity of the treating material. Further upon recovery of the well mixture at recovery conditions, the homogeneous gas phase working fluid containing natural gas can be readily separated from other components of the working fluid to create at least a gas phase fraction for capture to a pipeline or facility.

Notably, application of a homogeneous gas phase containing natural gas and a treating material permits control of the hydrostatic pressure within the wellbore or reservoir due to the inherent low density of the homogeneous gas phase. In the case of circulation of a treating material to a desired location within the wellbore, the circulation pressure, for example at the perforations, can be maintained below the reservoir feed pressure to prevent entry of the working fluid into the reservoir, should that effect be desired. For a matrix injection operation, the bottom hole injection pressure to the reservoir can be controlled to ensure feed at above the reservoir feed pressure while also ensuring the bottom hole injection pressure is below the formation fracturing pressure to prevent hydraulic fracturing of the reservoir. During recovery of a matrix injection operation, the reduced hydrostatic resulting from the homogeneous working fluid mixture will allow additional drawdown to be applied at the reservoir, thereby providing an opportunity to release a greater portion of capillary trapped liquids, plus providing a larger pressure potential to increase flow rate, should those effects be desired. Further, the embodiment is useful where at least the gas phase of the recovered surface stream is desired captured at surface; the gas phase is pipeline compatible and the wellhead flow pressure is sufficient to overcome at least the recovery system inlet pressure.

Second Embodiment

Working Fluid Comprising Natural Gas and a Treating Material to Remove a Recovery Target Material During Well Servicing A second embodiment involves creating a working fluid on surface that can be or include at least natural gas and optionally a treating material, and that when injected into the well will mix with and vaporize a recovery target material to form a well mixture that can be recovered to surface, wherein the recovery target material and at least the gas portion of the well mixture are in a homogenous gas phase. This embodiment is particularly useful for well servicing operations to place treating materials (e.g., the delivery target material) and subsequently remove unwanted materials (e.g., the recovery target material) where: density control is desired such that the treating material or the unwanted material will not enter the reservoir, good dispersion of the treating material to contact an unwanted material throughout a wellbore or into a reservoir is desired, low reservoir resistive forces are desired such that placement of the treating substance into the smallest pores or fissures of the reservoir is achieved, low reservoir resistive forces are desired such that removal of the unwanted material from the smallest of the pores and fissures is achieved, presence of an expanding gas within the well servicing mixture is desired to assist with vaporization, entrainment, transport or removal of the unwanted material, its reaction product, or accompanying materials from the wellbore or reservoir, or extended contact time of the treating material on the unwanted material is desired. Further, the embodiment is useful where at least the gas phase of the recovered surface stream is desired captured at surface; the gas phase is pipeline compatible and the wellhead flow pressure is sufficient to overcome at least the recovery system inlet pressure.

In this embodiment, at common servicing pressures, the natural gas content and composition of the natural gas working fluid is controlled to ensure that the well mixture created within the wellbore or reservoir during the well servicing operation is in a homogenous gas phase can include the at least the natural gas of the working fluid and the vaporized unwanted material or its reaction products. The natural gas quantity and composition within at least the well mixture are sufficient to vaporize between 10 wt % to 100 wt % of the unwanted material (e.g., the recovery target material). The injected working fluid contains natural gas and optionally a well servicing fluid that may be comprised of, or contain, a well servicing liquid and the treating material. The surface injection pressure and temperature are selected so that the well mixture at the servicing condition is in a homogenous gas phase; this state is maintained within the wellbore or reservoir where the unwanted material to be removed mixes with and is vaporized, entrained by or is displaced by the injected working fluid to form the well mixture. At least the well mixture can then be readily flowed to surface and recovered in a recovery stream.

Maintaining the well mixture in a homogenous gas phase during at least removal of the unwanted material is desirable as the gaseous phase reduces reservoir resistive flow effects to enhance recovery from the reservoir plus permits velocities and volumes to assist transport the unwanted material from the wellbore Enhanced vaporization by the natural gas-containing well mixture can be achieved with the working fluid by adding selected treating materials; such as surface tension modifiers to promote vaporization of the unwanted material, injecting at elevated rates to promote mixing to enhance vaporization, or adding chemicals to dissolve, disperse, or react to form products from the unwanted material suitable for vaporization. The natural gas content in the working fluid, the composition of the natural gas, the composition of the treating material, the composition and state of the unwanted material or combinations thereof can be manipulated to maintain the desired homogenous gas phase behaviors. Further, upon recovery of the servicing fluids at recovery conditions, the homogeneous gas phase well mixture can be readily separated from other phases present within the returning stream mixture to provide at least a gas phase fraction for capture. Additionally, as the natural gas returns to the surface, it provides energy by expansion which further enhances removal of accompanying liquid or solids portion of the well servicing fluid by increasing volume, hence velocity, and reducing the hydrostatic pressure within the wellbore.

Notably, a homogeneous gas phase well mixture containing natural gas and an unwanted material permits control of the hydrostatic pressure within the wellbore or reservoir due to the inherent low density of the homogeneous gas phase. In the case of circulation of a treating material to a desired location within the wellbore, the circulation pressure, for example at the perforations, can be maintained below the reservoir feed pressure to prevent entry of the well servicing fluid s into the reservoir, should that effect be desired. For a matrix injection operation, the bottom hole injection pressure to the reservoir can be controlled to ensure feed at above the reservoir feed pressure while also ensuring the bottom hole injection pressure is below the formation fracturing pressure to prevent hydraulic fracturing of the reservoir. During recovery of a matrix injection operation, the reduced hydrostatic resulting from the homogeneous gas well mixture will allow additional drawdown to be applied at the reservoir, thereby providing an opportunity to release a greater portion of capillary trapped liquids, plus providing a larger pressure potential to increase flow rate, should those effects be desired. Further, the embodiment is useful where at least the gas phase of the recovered surface stream is desired captured at surface; the gas phase is pipeline compatible and the wellhead flow pressure is sufficient to overcome at least the recovery system inlet pressure.

Third Embodiment

Working Fluid Comprising 100% Natural Gas for Removing a Recovery Target Material During Well Servicing A third embodiment involves selecting the working fluid composition to be 100% natural gas and creating a well mixture with natural gas and at least one vaporized recovery target material contained within the wellbore or reservoir such that the resulting well mixture is in a homogenous gas phase during at least the recovery steps of the operation. This embodiment is particularly useful for well servicing operations to remove unwanted materials (e.g., the recovery target material) where: simple gas phase assisted displacement, entrainment and vaporization of the unwanted material is desired, density control is desired such that the treating material or the unwanted material will not enter the reservoir, good dispersion of the natural gas to contact an unwanted material throughout a wellbore or into a reservoir is desired, low reservoir resistive forces are desired such that placement of the natural gas into the smallest pores or fissures of the reservoir to vaporize unwanted materials contained is achieved, low reservoir resistive forces are desired such that removal of the vaporized unwanted material from the smallest of the pores and fissures is achieved, presence of an expanding gas within the well servicing mixture is desired to assist with vaporization, or entrainment, transport or removal of the unwanted material, its reaction product, or accompanying materials from the wellbore or reservoir. Further, the embodiment is useful where at least the gas phase of the recovered surface stream is desired to be captured at surface; the gas phase is pipeline compatible and the wellhead flow pressure is sufficient to overcome at least the recovery system inlet pressure.

In this embodiment, at common servicing pressures, the natural gas quantity and composition are controlled to ensure that the unwanted material can be sufficiently vaporized and the well mixture created within the wellbore or reservoir during the well servicing operation is in a homogenous gas phase. The well mixture is comprised of the injected natural gas which combines with a liquid recovery target material contained within the well. The applied natural gas quantity and composition are sufficient to vaporize between 10 wt % to 100 wt % of the unwanted material, e.g., the recovery target material. As noted the injected working fluid contains only natural gas. The surface injection pressure and temperature are selected so that the well mixture is in a homogenous gas phase at the servicing condition; this state is maintained within the wellbore or reservoir where the unwanted material to be removed mixes with, is entrained by, or is displaced by, and is vaporized by the injected natural gas to form the well mixture. The well mixture is flowed from the wellbore or reservoir to surface and recovered.

Injecting natural gas to create the well mixture with a homogenous gas phase state during the servicing step is desirable as the gaseous phase permits low reservoir resistive forces where placement of the natural gas into the smallest pores or fissures of the reservoir is desired, low reservoir resistive forces are desired such that removal of the unwanted material in the homogeneous gas phase from the smallest of the pores and fissures is achieved, presence of an expanding gas within the well servicing mixture is desired to assist with vaporization, entrainment, transport and removal of the unwanted material, its reaction product, or accompanying materials from the wellbore or reservoir. Further, the embodiment is useful where at least the gas phase of the recovered surface stream is desired captured at surface; the gas phase is pipeline compatible and the wellhead flow pressure is sufficient to overcome at least the recovery system inlet pressure.

Fourth Embodiment

Sequential Natural Gas Injection with a Well Servicing Fluid to Minimize Servicing Fluid Phase Mixing During Well Servicing A further embodiment relates to well servicing operations using a working fluid comprising natural gas, wherein the working fluid and a well servicing fluid are injected into the wellbore sequentially and mixing between the injected fluids is minimized during the placement step in order to better maintain the individual behaviors or properties of the injected treating material and working fluid. The well servicing fluid can be or include a treating material, or a well servicing liquid, or a mixture of the treating material and well servicing liquid. This embodiment is particularly useful for well servicing operations to apply treating materials and/or well servicing liquids or to remove unwanted materials where: placement of a concentration of the treating material or well servicing liquid with no or little natural gas content such as to improve chemical attack on an unwanted material or to promote vaporization of contacted materials, or deployment of a fluid to isolate vaporized materials from other fluids within the well is desired. Further, following contact with an unwanted material by the treating material and as the well mixture is recovered from the well, mixing of the returning natural gas stream with returning sequentially injected liquid is encouraged to cause at least the unwanted material to vaporize. This mixing is encouraged due to reasons such as a density driven liquid fall back in upward flow or gas phase bypass and vaporization in horizontal flow. Alternatively, mixing and vaporization of the sequentially injected fluids or with a target recovery material may occur within a reservoir matrix to form a desired homogeneous well mixture. Mixing may be enhanced to at least a certain extent with selected fluid properties and injection rates. Beneficially, alternating injection of the well servicing fluid with natural gas permits control of hydrostatics during injection and recovery to manage pressure within the wellbore, for example at the perforations. In this manner a desired homogenous gas phase content working fluid is formed within the wellbore. When deployed in this manner, the returning homogenous gas phase well mixture may contain and serve to transport the greater portion of the vaporized unwanted materials to remove them from the wellbore. Alternatively, the return well servicing fluid stream or components thereof may mostly remain within the well as a placed material, or commingle with, to evaporate into, the returning homogeneous well mixture. Further, the embodiment is useful where at least the gas phase of the recovered surface stream is to be captured at surface; the gas phase composition is pipeline compatible and the wellhead flow pressure can be sufficient to overcome at least the recovery system inlet pressure. In this manner the injected fluids form, at least during recovery, a homogenous gas phase well mixture within the well.

Fifth Embodiment

Using Reservoir Flow to Contribute to a Circulation Return Stream During Well Servicing In an additional fifth embodiment, flow from the reservoir is maintained during at least a part of a circulation servicing operation such that the reservoir flow contributes to the return stream to enhance vaporization and removal of unwanted materials from the reservoir, or to contribute to and enhance removal from the well of at least the homogeneous gas phase well mixture. This embodiment is useful within well servicing operations where: an unwanted material is to be removed from a wellbore or reservoir and the reservoir flow pressure is sufficiently high that the well can produce at the well servicing conditions, the well production contains at least some free and unsaturated natural gas, the injected natural gas working fluid is minimized by utilizing reservoir gases to assist with the vaporization and recovery flow, where natural gas injection quantity is constrained to less than an optimal rate, or where capture of the combined injected and native natural gas during a well servicing operation is desired.

In this embodiment, at common servicing pressures, the natural gas content and composition of the natural gas working fluid are controlled to ensure that a well mixture created within the wellbore or reservoir is in a homogenous gas phase and such that the servicing or recovery pressure is less than the reservoir flow pressure. The working fluid can be or include at least natural gas and may also comprise a treating material. The working fluid is injected into the wellbore and combines with a liquid or solid recovery target material (e.g., an unwanted material) contained within the well. When the working fluid is circulated to a servicing point within the wellbore, the working fluid and any of the recovery target material plus natural gas and fluids or materials produced from the reservoir are commingled and the combined vaporized components serve to form the homogeneous gas phase well mixture. The vaporized unwanted material content within the formed well mixture at the servicing conditions may be in the range of 10 wt % to 100 wt %. The surface injection pressure and temperature are selected so that the formed well mixture at the servicing condition is in a homogenous gas phase and exhibits the desired behaviors; this state is maintained within the wellbore or reservoir to provide a servicing pressure below the reservoir flowing pressure. This may be prior to or following contact with the unwanted material to be removed which mixes with, vaporizes, is entrained by or is displaced by either of the working fluid or the combined working fluid and produced reservoir fluids. The well mixture is flowed from the wellbore or reservoir to surface and recovered.

Sixth Embodiment

Condensation from a Homogeneous Gas Phase Working Fluid to Place of Treating Material in Liquid Phase During Well Servicing In an additional sixth embodiment, the quantity and composition of the natural gas can be selected such that at the location in the well wherein a working fluid comprising natural gas and a treating substance (delivery target material) initially places the treating substance (delivery treating material) in the homogeneous gas phase, and with a reduction in pressure created during the servicing step, or by a shut in or at recovery conditions, the natural gas and delivery target material in the working fluid caused to condense at least a portion of the delivery target material. The selected natural gas composition and content and the caused pressure reduction results in a pressure state such that the working fluid is no longer at conditions permitting existence in a homogeneous gas or vapor state. Rather the working fluid physical conditions are now within the phase envelope to condense at least the treating substance and thereby serve to deliver the treating substance in a liquid phase. This embodiment is useful within well servicing operations where: a treating substance is to be placed within a wellbore or reservoir as a homogenous gas phase mixture at the servicing conditions, and the treating substance at that servicing point is desired to be in a liquid phase to permit separation from the working fluid or to achieve the desired effect on an unwanted material.

Seventh Embodiment

Condensation from a Homogeneous Gas Phase Well Mixture to Separate an Unwanted Material at Surface During Well Servicing In a seventh embodiment, the quantity and composition of the natural gas can be selected so that at surface recovery conditions (the recovery pressure and temperature), the recovered homogeneous gas phase well mixture is caused to condense at least a portion of the removed unwanted material (recovery target material). The selected natural gas composition and content and the recovery pressure and temperature conditions cause the well mixture to no longer exist at conditions supportive of a homogeneous gas or vapor state. Rather, the working fluid physical conditions are now within the phase envelope of the mixture (below the dew point) to condense at least the contained unwanted material and thereby serve to remove the unwanted material from the gas phase. This embodiment is useful within well servicing operations where: an unwanted substance is to be removed from a wellbore or reservoir as a component in the homogenous gas phase well mixture at the servicing conditions, and the unwanted substance at the surface recovery point is desired to be in a liquid phase to permit separation from the homogeneous well mixture to minimize potential contamination permitting a composition to support capture of the recovered gas stream.

What is claimed is:

1. A method for servicing a hydrocarbon well using natural gas in a wellbore drying operation, comprising:
preparing a working fluid having a composition comprising about 10 weight percent (wt %) to 100 wt % of a gas phase natural gas, and wherein the quantity and composition of the natural gas is selected so that under specified well intervention conditions, the natural gas and a liquid phase recovery target material form a mixture in the condensing vapor-gas or vapor-gas part of the mixture's phase envelope, wherein the specified well intervention conditions comprises at least one of a specified reservoir temperature and a specified reservoir pressure, a specified reservoir fracturing pressure, a specified surface recovery pressure, a specified servicing depth, or a specified wellbore configuration and a specified wellbore geometry;
during the well intervention operation and at the specified well intervention conditions, injecting the working fluid into the well, contacting the working fluid with the liquid phase recovery target material in the well, vaporizing the recovery target material, and forming a homogeneous gas phase well mixture of the recovery target material and natural gas;
recovering at least a portion of the homogenous gas phase well mixture at surface; and
circulating the working fluid past the recovery target material in a wellbore of the well and vaporizing at least a portion of the recovery target material.

2. The method of claim 1, wherein the working fluid comprises a delivery target material.

3. The method of claim 2, wherein the delivery target material is a treating substance that causes at least one of a physical or chemical change in the recovery target material in the process of forming the gas phase homogeneous well mixture.

4. The method of claim 1, wherein the recovery target material is in the well and comprises an aqueous liquid, an organic liquid, a hydrocarbon liquid, or any mixture thereof.

5. The method of claim 4, wherein the recovery target material comprises the aqueous liquid, and wherein the aqueous liquid comprises a dissolved salt, an acid, a water soluble organic material, or any mixture therein.

6. The method of claim 4, wherein the recovery target material comprises the organic liquid, and wherein the organic liquid comprises an alcohol, a ketone, an ester, an amide, an aldehyde, a carboxylic acid, an amide, or any mixture thereof.

7. The method of claim 4, wherein the recovery target material comprises the hydrocarbon liquid, and the hydrocarbon liquid comprises an alkane, an alkene, an alkyne, an aromatic, or any mixture thereof.

8. The method of claim 1, wherein the natural gas is sourced from liquefied natural gas.

9. The method of claim 1, further comprising after injecting the working fluid into the well, stopping the injecting thereby reducing pressure in the well.

10. A method for servicing a hydrocarbon well using natural gas in a wellbore dying operation, comprising:
preparing a working fluid having a composition comprising a gas phase natural gas between 10 and 100 wt %, and a liquid phase delivery target material, wherein the quantity and composition of the natural gas is selected so that under specified well intervention conditions, the natural gas and the delivery target material form a mixture in the condensing vapor-gas or vapor-gas part of the mixture's phase envelope, wherein the specified well intervention conditions comprise at least one of a specified reservoir temperature and a specified reservoir pressure, a specified reservoir fracturing pressure, a specified surface recovery pressure, a specified servicing depth, or a specified wellbore configuration and a specified wellbore geometry;
during the well intervention operation, injecting the working fluid into the well and depositing the delivery target material at a location in the well that is at the specified well intervention conditions, wherein depositing the delivery material comprises reducing a pressure in the well so that at least a portion of the delivery target material condenses as the pressure in the well is reduced and so that the delivery target material is deposited as a liquid at the location in the well;

recovering at least a portion of the natural gas in the working fluid at surface; and circulating the working fluid past the recovery target material in a wellbore of the well and vaporizing at least a portion of the recovery target material.

11. The method of claim 10, wherein the natural gas is sourced from liquefied natural gas.

12. A method for servicing a hydrocarbon well using natural gas in a wellbore drying operation, comprising:

preparing a working fluid having a composition comprising about 10 weight percent (wt %) to 100 wt % of a gas phase natural gas, wherein the quantity and composition of the natural gas is selected so that under specified well intervention conditions, the natural gas and a liquid phase recovery target material form a mixture in the condensing vapor-gas or vapor-gas part of the mixture's phase envelope, wherein the recovery target material comprises an aqueous liquid, an organic liquid, a hydrocarbon liquid, or any mixture thereof, and wherein the working fluid comprises a delivery target material, wherein the specified well intervention conditions comprise at least one of a specified reservoir temperature and a specified reservoir pressure, a specified reservoir fracturing pressure, a specified surface recovery pressure, a specified servicing depth, or a specified wellbore configuration and a specified wellbore geometry;

during the well intervention operation and at the specified well intervention conditions, injecting the working fluid into the well, contacting the working fluid with the liquid phase recovery target material in the well, vaporizing the recovery target material, and forming a homogeneous gas phase well mixture of the recovery target material and natural gas;

recovering at least a portion of the homogenous gas phase well mixture at surface, and circulating the working fluid past the recovery target material in a wellbore of the well and vaporizing at least a portion of the recovery target material.

13. The method of claim 12, wherein the delivery target material is a treating substance that causes at least one of a physical or chemical change in the recovery target material in the process of forming the gas phase homogeneous well mixture.

14. The method of claim 12, wherein the recovery target material comprises the aqueous liquid, and wherein the aqueous liquid comprises a dissolved salt, an acid, a water soluble organic material, or any mixture therein.

15. The method of claim 12, wherein the recovery target material comprises the organic liquid, and wherein the organic liquid comprises an alcohol, a ketone, an ester, an amide, an aldehyde, a carboxylic acid, an amide, or any mixture thereof.

16. The method of claim 12, wherein the recovery target material comprises the hydrocarbon liquid, and the hydrocarbon liquid comprises an alkane, an alkene, an aromatic, or any mixture thereof.

* * * * *